(12) United States Patent
Bar-Ziv et al.

(10) Patent No.: US 8,110,165 B2
(45) Date of Patent: Feb. 7, 2012

(54) PROCESS FOR MANUFACTURING HIGH DENSITY BORON CARBIDE

(75) Inventors: Shimshon Bar-Ziv, Misgav (IL);
Yehoshua Hachamo, Nahariya (IL);
David Gorni, Michmoret (IL); Zohar Ophir, Haifa (IL); Itamar Gutman, Kiryat Blalik (IL); Joseph Frey, Haifa (IL); Zvi Nisenholz, Misgav (IL)

(73) Assignee: Rafael-Armament Development, Haifa (IL)

( * ) Notice: Subject to any disclaimer, the term of this patent is extended or adjusted under 35 U.S.C. 154(b) by 467 days.

(21) Appl. No.: 11/630,711

(22) PCT Filed: Jun. 17, 2005

(86) PCT No.: PCT/IL2005/000645
§ 371 (c)(1),
(2), (4) Date: Dec. 18, 2007

(87) PCT Pub. No.: WO2005/123626
PCT Pub. Date: Dec. 29, 2005

(65) Prior Publication Data
US 2008/0279747 A1    Nov. 13, 2008

(30) Foreign Application Priority Data
Jun. 22, 2004 (IL) .......................... 162676

(51) Int. Cl.
*C01B 35/00* (2006.01)
*C01B 25/08* (2006.01)
*C01B 31/36* (2006.01)
*C01B 31/00* (2006.01)

(52) U.S. Cl. ........ 423/291; 423/276; 423/289; 264/29.1

(58) Field of Classification Search .................. None
See application file for complete search history.

(56) References Cited

U.S. PATENT DOCUMENTS

| | | | |
|---|---|---|---|
| 4,195,066 A | 3/1980 | Schwetz et al. | |
| 5,505,899 A | 4/1996 | Sigl et al. | |
| 5,720,911 A | 2/1998 | Taylor et al. | 264/29.1 |
| 7,381,690 B1 * | 6/2008 | Ding et al. | 508/137 |

FOREIGN PATENT DOCUMENTS

| | | |
|---|---|---|
| EP | 0 239 789 | 10/1987 |
| GB | 2014193 | 8/1979 |
| JP | 07169190 | 7/1995 |
| WO | WO 96/09065 | 3/1996 |

OTHER PUBLICATIONS

Niosh; Boron Carbide; Manual of Analytical Methods; 4th Edition; Aug. 15, 1994.*
Database Inspec Online, Instit. of Elec. Engi., Stevenage, GB; 1986, Thevenot et al XP002342830, access. No. 2736187.
Database Inspec Online, Instit. of Electrical Engineers, Stevenage, GB; Nov. 1981, Schwetz K et al: XP002342831, access. No. 1840110.
International Search Report dated Sep. 15, 2006 from PCT/IL2005/000645.

* cited by examiner

*Primary Examiner* — Melvin Mayes
*Assistant Examiner* — Guinever Gregorio
(74) *Attorney, Agent, or Firm* — Ohlandt, Greeley, Ruggiero & Perle, LLP

(57) ABSTRACT

A process for manufacturing high density boron carbide by pressureless sintering, enabling to create sintered products of complex shapes and high strength. The process comprises mixing raw boron carbide powder with carbon precursor, such as a polysaccharide, compacting the mixture to create an object of the desired shape, and finally carbonizing and sintering the object at higher temperatures.

16 Claims, No Drawings

PROCESS FOR MANUFACTURING HIGH DENSITY BORON CARBIDE

FIELD OF THE INVENTION

The present invention relates to a process for manufacturing high density boron carbide by pressureless high temperature sintering.

BACKGROUND OF THE INVENTION

The fast growing demand for extremely hard materials results from their numerous applications. Boron carbide, a typical representative of such materials, can be used in armor plates, and as an abrasion resisting material. Most applications of boron carbide require that its density be as high as possible—in other words, the density should be close to the theoretical density (TD). The manufacturing of high density boron carbide is a multistage process, whose final stage is sintering which can be conducted under high pressure or without applying a pressure. Pressureless sintering of materials is more advantageous compared to hot pressing with respect to process cost and ability to organize it in a continuous mode. In the case of a batch mode, pressureless sintering permits a larger scale production.

The common practice to achieve high density of materials (more than 90% TD) is a use of sintering additives. In the case of boron carbide, carbon is used as a sintering aid. The source of carbon may be amorphous carbon (in a form of carbon black, for example) or carbon precursors. In both cases, the boron carbide powder is blended with an additive, then press compacted and sintered. If a carbon precursor is used as an additive, the compacted "green" body should be further heat-treated by pyrolysis or carbonization (prior to sintering) in order to transform the precursor to carbon.

U.S. Pat. No. 4,195,066 discloses a process which requires very fine raw boron carbide powder (grain size <1 μm, specific area 10-50 m$^2$/g) and uses additives in the form of amorphous carbon as well as organic carbon precursor. Today the submicron boron carbide powder is extremely expensive, therefore the application of the said process is limited.

The process disclosed in GB 2,014,193 requires a submicron (0.1 μm) boron carbide powder and uses glucose as a carbon precursor.

U.S. Pat. No. 5,720,911 describes a method of making a boron carbide article by sintering which includes mixing boron carbide with an epoxidized resin in solution, drying to form a granulated homogenized mixture, and carbonizing by maintaining the mixture at least two constant temperatures for predetermined times.

U.S. Pat. No. 5,505,899 refers to a process for producing shaped bodies of boron carbide, comprising homogeneously mixing pulverulent boron carbide with at least one pulverulent monocarbide of Ti, Zr, Hf, V, Nb and Ta, sintering at temperatures from 2100° C. to 2250° C., and further densifying by hot isostatic pressing.

JP 07169190 describes a process comprising preparation of a carbon precursor powder from calcined coke, its further drying and mixing with boron-carbide powder, cold isostatic pressing and further carbonization at a temperature less than 2200° C. in a non-oxidizing atmosphere.

The art is always looking for improved processes which may lead to increased density of the final product and which permit to create more complex and stronger shapes of the final product. It is an object of the invention to provide a process which obtains higher density products utilizing a pressureless sintering and thus avoiding expensive hot pressing processes.

It is another object of the invention to provide an improved process for manufacturing high density boron carbide (about 96% TD) by pressureless high temperature sintering.

It is yet another object of the invention to provide an efficient process that permits to create more complex and stronger shapes of the sintered product.

Other objects and advantages of the invention will become apparent as the description proceeds.

SUMMARY OF THE INVENTION

The process of the invention comprises the steps of:
(a) pre-washing the raw ceramic powder with an organic solvent, preferably with alcohol solvent, preferably with isopropyl alcohol (IPA);
(b) mixing the washed boron carbide powder with a carbon precursor, preferably with phenolic resin or with an aqueous solution of a polysaccharide, preferably with maltodextrin;
(c) drying the mixture;
(d) granulating the dried mixture;
(e) compacting the granulated powder blend (to form the desired shape—flat or curved) by uniaxial pressing carried out at a temperature between room temperature and about 170° C., preferably at a temperature higher than 130° C.;
(f) carbonizing the compacted green object in an inert atmosphere, preferably in a nitrogen or argon atmosphere, by dwelling at high temperature for a predetermined time and controlling the heating rate; and
(g) sintering at a temperature range about 2290° C. to about 2350° C. in an inert atmosphere, preferably in argon, for a time period not less than 30 min, preferably for about 120 min.

DETAILED DESCRIPTION OF THE INVENTION

The main stages of the process are briefly described below:
Pre-washing of the Powder Boron carbide powder is mixed with IPA (technical grade) in the ratio 0.75 Kg boron carbide powder per liter IPA. The mixing is conducted for 24 hours. Different mixing devices can be used—ball mills, mechanical stirrers, blade mixers, etc.

Following the mixing the blend is dried at approximately 70° C. for 24 hours or preferably until IPA concentration is less than 1% (mass). The drying chamber is equipped with an exhaust pipe to let the IPA vapors out.
Mixing, Drying and Granulating Boron carbide powder is mixed with the carbon precursor (in the form of resin, preferably phenolic resin), dissolved in IPA, or in an aqueous solution of a polysaccharide, preferably maltodextrin. The required amount of carbon precursor depends on the carbon yield upon pyrolysis, where carbon contents should be 5-8 mass %. In both cases the mixture is dried and granulated. If a polysaccharide aqueous solution is chosen as the carbon precursor, the preferred drying method is by spray drying.
Compacting the Powder Blend The compaction under elevated temperature results in a viscous flow of the carbon precursor (which is phenolic resin or polysaccharide maltodextrin) along with the ceramic particles. The viscous flow enables compaction of non-flat (curved-shape) objects, where leveling of the pre-compacted powder, which is essential for obtaining uniform and homogeneous green object, is not possible.

Carbonizing the Compacted Green Object

Heating in an inert atmosphere (e.g., stream of nitrogen) of the compacted boron-carbide and carbon precursor blend is carried out at a high temperature in order to convert the precursor to carbon. The process is carried out in a controlled schedule because the gaseous products are to be evacuated from the compact object in a sufficiently slow rate in order not to cause their cracking, typically—but not imitatively—during 3 to 5 hours.

The term "high temperature" refers to temperatures which are typically in the range 550° C.-1050° C., preferably higher than 500° C.

Sintering

The green, carbonized objects are heated in an inert atmosphere (argon) in a controlled heating schedule, and soaked in high temperature (approx. 2300° C.). Surface and bulk diffusion processes result in densification and volume shrinkage of the objects. The carbon additive acts in a two-fold role: It reduces oxide compounds which hinder the sintering process, and it also inhibits grain growth at the sintering temperature.

EXAMPLES

The aforesaid and other characteristics and advantages of the invention will be better understood through the description of the following illustrative and non-limitative examples.

In all experiments the boron carbide powder having following characteristics has been used:
$D_{50} \leq 5.8$ μm, $D_{90} \leq 10$ μm
Boron to carbon ratio: 3.9-4.1
Contents of free carbon: 1.2% (mass)
Total contents of boron and carbon: 97% (mass)
Remaining contents of $B_2O_3$: 0.35% (mass)

Experimental Setup

1. Mixing was done with either ball-milling machine (in plastic container) or laboratory mixer.
2. Drying of IPA containing blends (after pre-wash stage or after mixing with phenolic resin) was carried out in a water jacket incubator (Shel Lab, model 3025). This kind of oven has water filled double-walls. Heating elements, located in the double-wall gaps, are utilized to control the water temperature which governs the chamber temperature. This kind of oven is required due to safety reasons, in order to avoid contact between the IPA vapors and the heating elements, which may result in explosion danger.
3. Spray drying was carried out in a Niro No. 1 Bowen tower (by Bowen Engineering, Columbia, Md., U.S.A.). Spraying parameters where as follows: Air inlet temperature—280° C., outlet temperature—140° C., atomizing air pressure—3.5 bar.
4. Carbonization was performed in a retot type furnace (Lindberg, model 51662-R), equipped with Nitrogen inlet and outlet tubes. Nitrogen flow rate (1 lit/min.) control was performed via rotameter.
5. The sintering furnace was a cylindrical-bottom loading type (by Centorr-Vacuum Industries, model 9×12-G-D6A3-A-25).

Example 1

Phenolic resin) Durit SC1008, by Borden Inc., Columbus, Ohio, U.S.A.) was diluted by IPA, at mixing ratio of 125 (gr. resin):1000 (cc IPA) to obtain a homogeneous solution. Boron carbide powder having particle size $D_{50}=5.8$ μm, $D_{90}=10$ μm and specific area (B.E.T.) 2.2 m$^2$/gr was gradually added to the resin solution. Raw resin/powder ratio was 15:100 (mass). The blend was mixed for 24 hrs, oven dried at 70° C. and the dried cake was granulated using a 20 mesh size sieve. A finer sieve can also be used.

The granulated powder was cold pressed (80 MPa) in a 59×59 mm mold to form flat green square-shaped objects having density of 1.36 to 1.60 g/cc. Further these objects were carbonized in a stream of nitrogen (1 lit/min). The heating schedule was as follows: heating at the rate 25° C./hr up to 550° C., further heating at the rate 100° C./hr up to 1000° C., soaking for 5 hrs., furnace cooling to room temperature. When this stage completed the carbonized green objects contained 5.4% of amorphous carbon. At the next stage the carbonized green objects were sintered in the stream of argon, utilizing the electrical resistance furnace having graphite elements and insulation. The heating schedule was as follows: double vacuum purge prior to heating in order to eliminate oxygen residues, Argon flow, heating to 1800° C. at the rate 900° C./hr, heating up to 2100° C. at the rate 300° C./hr, heating up to 2330° C. at the rate 150° C./hr, soaking for 30 mins., cooling at the rate 600° C./hr to approximately 1000° C. and then furnace cooling to room temperature.

The sintered objects has undergone 18% linear shrinkage upon sintering, and had a density of 2.3 g/cc, corresponding to 92.9% TD.

Example 2

Operating similarly to the procedure of Example 1, but with the difference that the stage of pre-washing was conducted in the following way: the boron carbide powder was mixed with IPA for 24 hours (mixing ratio 0.75 Kg powder/1 liter IPA). Then the mixture was dried in the oven at 70° C. and further processed according to Example 1 to form sintered boron carbide objects.

The final product had a density of 2.38 g/cc, corresponding to 94.4% TD.

Example 3

Operating similarly to Example 2, but with the difference that the pre-washing was carried out in methanol, the boron carbide powder was mixed with methanol for 24 hours (mixing ratio 0.75 Kg powder/1 liter methanol). Then the mixture was dried in the oven at 70° C. and further processed according to Example 1 to form sintered boron carbide objects.

The final product had a density of 2.376 g/cc, corresponding to 94.3% TD.

Example 4 (Comparative)

Operating similarly to Example 1, but with the difference that boron carbide powder had a smaller particle size, namely $D_{50}=4.6$ μm, $D_{90}=9.2$ μm and specific area (B.E.T.) 2.49 m$^2$/gr.

The final product had a density of 2.38 gr/cc, corresponding to 94.4% TD.

Example 5

Operating similarly to Example 4, but with the difference that pre-washed boron carbide powder was mixed with IPA as described in Example 2. The heating rate during the carbonization stage was 100° C./hr.

The final product had a density of 2.42 gr/cc, corresponding to 96% TD.

Example 6 (Comparative)

Operating similarly to Example 4, but with the difference that compaction process was carried out while the mold was heated to 160° C. The granulated powder was poured into the mold cavity, and then the pressure was applied for 10 minutes.

The final product had a density of 2.40 gr/cc, corresponding to 95.2% TD.

Example 7

Operating similarly to Example 6, but with the difference that pre-washed boron carbide powder was mixed with IPA as described in Example 2.

The final product had a density of 2.43 g/cc, corresponding to 96.4% TD.

Example 8 (Comparative)

Operating similarly to Example 6, but with the difference that compaction process was conducted in a spherical dome shaped mold. The dome inner spherical radius was 242 mm, the dome outer spherical radius was 247.5 mm, and basal diameter of the dome was 105 mm. The granulated powder was poured into the mold cavity and pressure was applied while the powder was not leveled. The phenolic resin has undergone a viscous flow along with the ceramic particles to fill the mold cavity between the dies and to form a uniform green compact.

The domes were sintered between top and bottom graphite dies, each one machined to match the outer and inner sphere radius, respectively. While sintering without the shaped graphite dies the domes have undergone a severe geometrical distortion, due to free sagging while being at the high sintering temperature. The sintered domes had a density of 2.395 g/cc, corresponding to 95% TD. While the spherical radii remained unchanged, both the dome basal diameter and the thickness have undergone 18% shrinkage.

Example 9

Operating similarly to Example 8, but with the difference that pre-washed boron carbide powder was mixed with IPA as described in Example 2.

The sintered domes had a density of 2.434 g/cc, corresponding to 96.6% TD.

Example 10 (Comparative)

An aqueous solution of 230 gr maltodextrin (dextrose equivalent, DE=15), 10 gr PVA (polyvinyl alcohol) and 1000 gr water were mixed with 1000 gr boron carbide powder having the same properties as in Example 4.

After that the slurry was spray-dried. A free flowing spherical granulated powder was obtained. The powder was then hot compacted in a 59×59 mm mold, while the mold was heated to 130° C. The compacting pressure 80 MPa, was applied for 10 minutes. Uniform high strength green objects were obtained. The green objects were pyrolyzed in a nitrogen stream in order to convert the maltodextrin to carbon. The heating schedule was as follows: heating at the rate 25° C./hr to 650° C., soaking for 5 hours, furnace cooling to room temperature. Sintering was carried out according to Example 1.

The final product density was 2.395 g/cc, corresponding to 95.1% TD.

Example 11

Operating similarly to Example 10, but with the difference that a pre-washed boron carbide powder had the same properties as in Example 4.

The final product density was 2.425 g/cc, corresponding to 96.2% TD.

Example 12

Operating similarly to Example 11, but with the difference that the objects had a shape of a spherical dome as described in Examples 8 and 9. During pressing, maltodextrin has undergone a viscous flow along with the ceramic particles to fill the mold cavity between the dies and to form a uniform, high strength green compact object. Carbonizing and sintering were conducted in the same mode as in Example 10.

The final product had a density of 2.43 g/cc, corresponding to 96.4% TD.

The invention claimed is:

1. A process for manufacturing boron carbide objects comprising the steps of:
   (a) pre-washing a raw boron carbide powder with an organic solvent selected from the group consisting of isopropyl alcohol, ethyl alcohol, methyl alcohol, acetone, and a combination thereof, said pre-washing including mixing for about 24 hours, followed by drying the washed boron carbide;
   (b) mixing the washed boron carbide powder with a carbon precursor selected from the group consisting of phenolic resin, aqueous solution of a polysaccharide, and mixture of two or more saccharides;
   (c) drying the mixture;
   (d) granulating the dried mixture;
   (e) compacting the granulated dried mixture to form a shaped object by applying a pressure thereto;
   (f) carbonizing the shaped body in an inert atmosphere, by dwelling at a high temperature for a predetermined period of time; and
   (g) sintering the carbonized shaped body at a temperature between 2300° C. and about 2350° C. in an inert atmosphere for a time period of not less than about 30 min.

2. The process according to claim 1, wherein the polysaccharide is maltodextrin.

3. The process according to claim 1, wherein the drying is carried out by spray drying.

4. The process of claim 1, wherein the pressure is applied uniaxially.

5. The process of claim 1, wherein the pressure is applied isostatically.

6. The process of claim 1, wherein the compacting is carried out with heating.

7. The process of claim 6, wherein the compaction is carried out at a temperature of between about 130° C. and about 170° C.

8. The process of claim 1, wherein compaction is carried out until the density of the compacted shaped body reaches between about 1.36 to about 1.60 g/cc.

9. The process of claim 1, wherein the carbonization step is carried out in a nitrogen atmosphere.

10. The process of claim 1, wherein the carbonization step is carried out in an argon atmosphere.

11. The process of claim 1, wherein the carbonization step is carried out at a controlled heating rate, which is between about 25° C./hr to about 100° C./hr.

12. The process of claim 1, wherein the sintering is carried out in an argon atmosphere.

13. The process of claim 1, wherein the sintering is carried out for a time period of about 120 minutes.

14. The process of claim 1, wherein the sintering is performed while the shaped body is constrained between shaped graphite dies having essentially a geometry to match a desired final geometry of said shaped body.

15. The process of claim 14, wherein the graphite dies have a non-flat, multi-curved shape.

16. Shaped, high-density boron carbide objects made by a process for manufacturing boron carbide objects comprising the steps of:
(a) pre-washing a raw boron carbide powder with an organic solvent selected from the group consisting of isopropyl alcohol, ethyl alcohol, methyl alcohol, acetone, and a combination thereof, said pre-washing including mixing for about 24 hours, followed by drying the washed boron carbide;
(b) mixing the washed boron carbide powder with a carbon precursor selected from the group consisting of phenolic resin, aqueous solution of a polysaccharide, and mixture of two or more saccharides;
(c) drying the mixture;
(d) granulating the dried mixture;
(e) compacting the granulated dried mixture to form a shaped object by applying a pressure thereto;
(f) carbonizing the shaped body in an inert atmosphere, by dwelling at a high temperature for a predetermined period of time; and
(g) sintering the carbonized shaped body at a temperature between 2300° C. and about 2350° C. in an inert atmosphere for a time period of not less than about 30 min.

* * * * *

UNITED STATES PATENT AND TRADEMARK OFFICE
CERTIFICATE OF CORRECTION

| | | |
|---|---|---|
| PATENT NO. | : 8,110,165 B2 | Page 1 of 1 |
| APPLICATION NO. | : 11/630711 | |
| DATED | : February 7, 2012 | |
| INVENTOR(S) | : Bar-Ziv et al. | |

It is certified that error appears in the above-identified patent and that said Letters Patent is hereby corrected as shown below:

On the Title Page, Item (73) Assignee:
Please delete "Rafael-Armament Development, Haifa (IL)" should read "-Rafael-Armament Development Authority Ltd., Haifa (IL)-"

Signed and Sealed this
Sixth Day of January, 2015

Michelle K. Lee
*Deputy Director of the United States Patent and Trademark Office*

INTER PARTES REEXAMINATION CERTIFICATE (792nd)
United States Patent
Bar-Ziv et al.

(10) Number: US 8,110,165 C1
(45) Certificate Issued: Jan. 10, 2014

(54) PROCESS FOR MANUFACTURING HIGH DENSITY BORON CARBIDE

(75) Inventors: Shimshon Bar-Ziv, Misgav (IL); Yehoshua Hachamo, Nahariya (IL); David Gorni, Michmoret (IL); Zohar Ophir, Haifa (IL); Itamar Gutman, Kiryat Blalik (IL); Joseph Frey, Haifa (IL); Zvi Nisenholz, Misgav (IL)

(73) Assignee: Rafael-Armament Development, Haifa (IL)

Reexamination Request:
No. 95/002,059, Jul. 25, 2012

Reexamination Certificate for:
Patent No.: 8,110,165
Issued: Feb. 7, 2012
Appl. No.: 11/630,711
Filed: Dec. 18, 2007

(21) Appl. No.: 95/002,059
(22) PCT Filed: Jun. 17, 2005
(86) PCT No.: PCT/IL2005/000645
§ 371 (c)(1),
(2), (4) Date: Dec. 18, 2007
(87) PCT Pub. No.: WO2005/123626
PCT Pub. Date: Dec. 29, 2005

(30) Foreign Application Priority Data
Jun. 22, 2004 (IL) ......................... 162676

(51) Int. Cl.
*C01B 35/00* (2006.01)
*C01B 25/08* (2006.01)
*C01B 31/36* (2006.01)
*C01B 31/00* (2006.01)
*C04B 35/563* (2006.01)
*C04B 35/626* (2006.01)

(52) U.S. Cl.
CPC ........... *C04B 35/563* (2013.01); *C04B 35/6264* (2013.01); *C04B 35/62655* (2013.01); *C04B 2235/3821* (2013.01); *C04B 2235/48* (2013.01); *C04B 2235/5409* (2013.01); *C04B 2235/5436* (2013.01); *C04B 2235/5463* (2013.01); *C04B 2235/604* (2013.01); *C04B 2235/608* (2013.01); *C04B 2235/656* (2013.01); *C04B 2235/6562* (2013.01); *C04B 2235/77* (2013.01); *C04B 2235/94* (2013.01); *C04B 2235/9615* (2013.01)
USPC ........... 423/291; 264/29.1; 423/276; 423/289

(58) Field of Classification Search
None
See application file for complete search history.

(56) References Cited

To view the complete listing of prior art documents cited during the proceeding for Reexamination Control Number 95/002,059, please refer to the USPTO's public Patent Application Information Retrieval (PAIR) system under the Display References tab.

*Primary Examiner* — Timothy J. Kugel

(57) ABSTRACT

A process for manufacturing high density boron carbide by pressureless sintering, enabling to create sintered products of complex shapes and high strength. The process comprises mixing raw boron carbide powder with carbon precursor, such as a polysaccharide, compacting the mixture to create an object of the desired shape, and finally carbonizing and sintering the object at higher temperatures.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-16 are cancelled.

\* \* \* \* \*